United States Patent [19]
Basse et al.

[11] Patent Number: 5,693,383
[45] Date of Patent: Dec. 2, 1997

[54] PACKING MATERIAL

[75] Inventors: Hartwig Basse, Nordenham; Hans-Dieter Kruse, Stadland, both of Germany

[73] Assignee: Norddeutsche Seekabelwerke Aktiengesellschaft, Germany

[21] Appl. No.: 509,298

[22] Filed: Jul. 31, 1995

[30] Foreign Application Priority Data

Aug. 4, 1994 [DE] Germany ............... 44 27 576.5

[51] Int. Cl.$^6$ ................................... B01J 19/32
[52] U.S. Cl. .................. 428/34.1; 428/35.7; 261/94; 261/DIG. 72
[58] Field of Search .................. 428/34.1, 35.7; 261/94, DIG. 72

[56] References Cited

U.S. PATENT DOCUMENTS

| 4,668,442 | 5/1987 | Lang | 261/94 |
| 5,240,597 | 8/1993 | Ueda | 210/149 |

FOREIGN PATENT DOCUMENTS

| 3625809 | 2/1987 | Germany. |
| 4202327 | 8/1992 | Germany. |

*Primary Examiner*—Kathleen Choi
*Attorney, Agent, or Firm*—Rothwell, Figg, Ernst & Kurz, P.C.

[57] ABSTRACT

Packing material for biological waste water treatment, and process for the production of such packing material. Packing material made of tube-shaped base members with net structured outer surface are provided with at least one water-impermeable surface-increasing element arranged on the outer surface of each base member and directly connected thereto, for increasing the specific growing surface for biofilm.

14 Claims, 4 Drawing Sheets

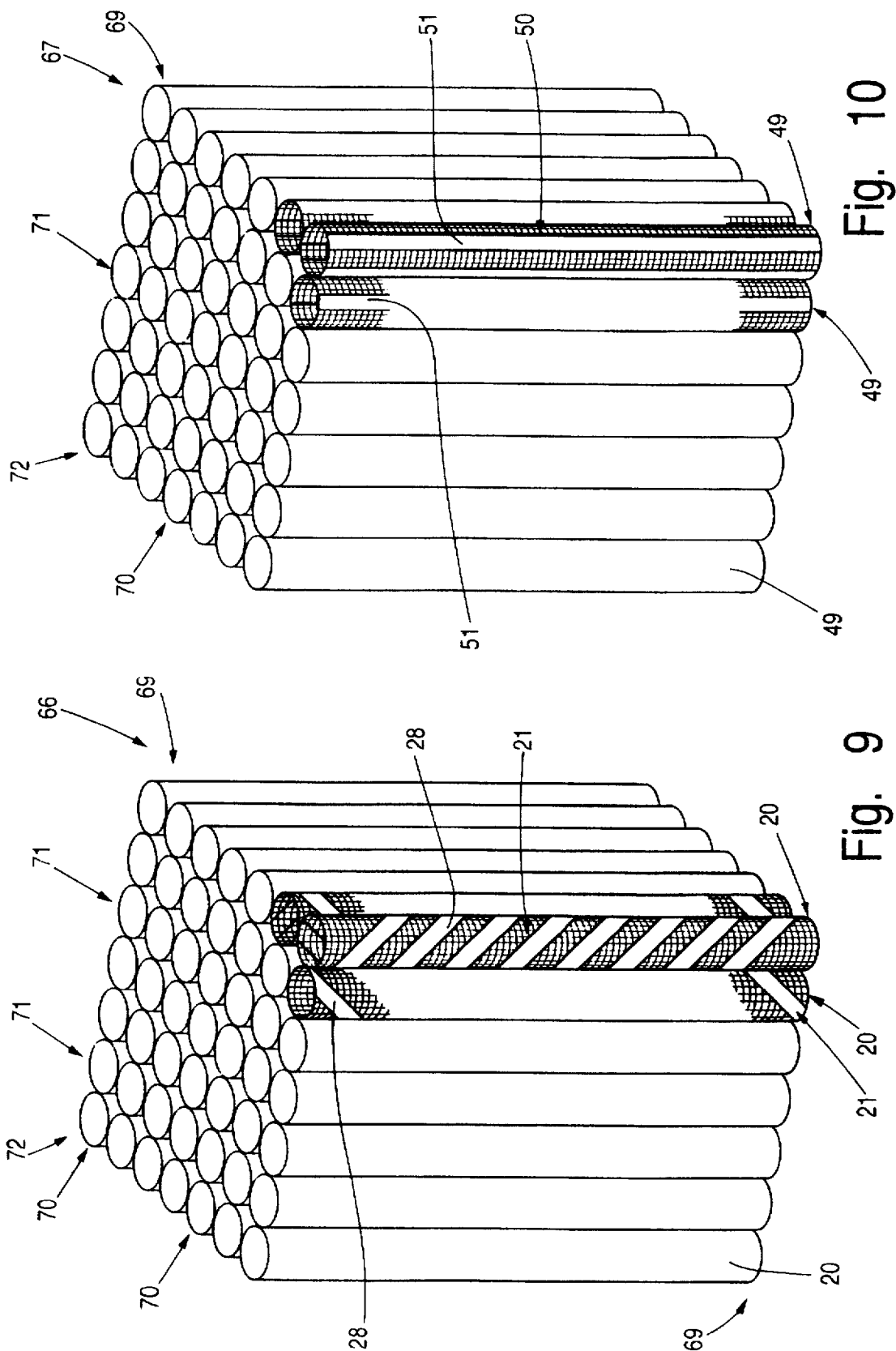

PACKING MATERIAL

BACKGROUND OF THE INVENTION

1. Field of the Invention

The invention relates to a packing material, especially for biological waste water treatment according to the preamble of claim 1. The invention furthermore relates to a process for the production of a packing material according to the preamble of claim 15.

2. Description of the Background Art

According to the invention, packing material, e.g. packing element, refers to preferably tube-shaped base members with especially net-like outer surfaces and blocks of packing material made from a plurality of packing elements attached to one another. The packing material is preferably made of plastic. It may, however, also entirely or partly be made of another material. The dimensions of the packing material are arbitrary.

Packing material of the type addressed here is applied mainly were an improvement of the interchange of substances between fluids, and thus gases and/or liquids is desired. The packing material is used, for example, in absorption, desorption, destillation, rectification, extraction, humidification, and condensation. These packing materials have proven to be especially successful in the field of biological waste water treatment where they are employed both in random dumping and in ordered packs of packing elements for the formation of, for example, submersed packed beds. The packing material serves as a carrier for the bacteria required for the biological treatment, specifically a so-called biofilm. The performance of a system equipped with such a packing material depends a plurality of factors. On the one hand, the specific growing surface provided by the packing material shall be as large as possible, on the other hand, a good hold for the bacteria on the packing material is required. Finally, the liquid to be treated shall be capable of freely flowing around or moistening the biofilm.

Known is, for example, a packing material configured as a packing element which comprises a tube-shaped base member with a net-like structured outer surface. This packing material has the disadvantage that the surface of the outer surface is too small and, consequently, the specific growing surface for the biofilm is too small as well. As a result, the effectiveness of a waste water treatment plant provided with such a packing material is reduced.

SUMMARY OF THE INVENTION

Starting from this state of the art, the present invention is based on the problem of providing an effective packing material and a process for a simple production thereof.

To attain this object, the packing material according to the invention has the features of claim 1. The specific growing surface available for the biofilm is increased by the arrangement of at least one surface-increasing element on the outer surface of the base member. The effectiveness of the packing material is thereby substantially increased.

Preferably, the or each element has a strip-shaped design and is wound round the outer surface from the outside. Such a design of the packing material permits a particularly easy production thereof. It is, however, also possible to arrange the or each element in a ring-shaped manner round the base member and/or to arrange the elements so that they extend in the longitudinal direction of the base members.

The strip-shaped surface-increasing elements are, according to the invention, formed from a foil. This strip-shaped foil has a relatively large surface and little weight. Furthermore, the dimensions of the packing elements are not or only slightly increased by the strip-shaped foil arranged on the outside of the outer surface of the base members.

In the preferred embodiment of the invention, the foil is designed to be water impermeable, preferably water and air impermeable. In this manner, no interchange of substances through the strip-shaped foil of the surface-increasing elements can take place. On the contrary, the substances to be treated are forced to flow along the surface of the strip-shaped foil. In order to keep the flow resistance as low as possible, the foil, according to a further proposal of the invention, is designed to be smooth. Smooth, in this connection, means that the surface of the strip-shaped foil has sufficient roughness for a safe hold of the biofilm to be grown thereon and that this roughness, however, has no or no significant adverse effect on the flow properties.

According to a preferred development of the invention, the surface of the or each element is provided with distance members, especially web or knob-like distance pieces. This has the advantage that the base members of the packing elements are always spaced apart from one another at a defined distance in random dumping of packing elements as well as in ordered packs of packing elements. It is avoided that the base members or adjacent surface-increasing elements stick together. As a result, the liquid to be treated can freely flow around the biofilm and the effectiveness of the packing material is further increased.

The surface-increasing elements, especially the strip-shaped foils are directly attached to the outside of the outer surface of each base member by a fixed, durable and/or inseparable connection of the strip-shaped foil with the respective base member, which is created by welding, sealing and/or adhesive bonding and, therefore, directly.

The process according to the invention for the production of a packing material is provided with the measures of claim 15. The packing material according to the invention can be produced in a particularly simple manner by the process according to the invention.

Preferably, the or each cold surface-increasing element made of plastic is arranged on the base member, which is also made of plastic, immediately after the extrusion of the base member. As a result, the base member, as well as the or each element, are fixedly attached to one another. Consequently, additional heating for the mutual connection of the base member and/or the element is not necessary; the production process is thus energy-saving. Alternatively, the still hot elements may be attached to cold base members, or the base members as well as the elements may be hot for joining, specifically still have a residual heat from the preceding production process. Furthermore, the base members and/or the elements may be additionally heated or reheated after prior cooling. In this case, the elements can be applied to the base member in an additional working operation. This additional heating or reheating of the base members may be carried out only partially, specifically in those locations in which the elements adjoin the outside of the outer surface of the respective base member. Preferably, the base member is only heated on the outside. Finally, the elements may also be adhesively bonded to the base members, preferably by means of a contact adhesive.

BRIEF DESCRIPTION OF THE DRAWINGS

Preferred developments of the invention result from the subclaims and the description. Exemplary embodiments of the invention are described hereinbelow with reference to the drawings. In these:

FIG. 9 shows a block of packing material in a schematic perspective plan view, FIG. 10 shows a second exemplary embodiment of a block of packing material, in a representation analogous to FIG. 9.

DESCRIPTION OF THE PREFERRED EMBODIMENTS

The packing elements and blocks of packing elements shown here are used in biological waste water treatment. The packing elements are applied in irregular dumpings, whereas the ordered blocks of packing elements are used for the formation of trickling filters, rotating biological contactors, or submersed packed beds. For this purpose, packing elements as well as blocks of packed elements are overgrown by a biomass, a so-called biofilm.

Figure 1:
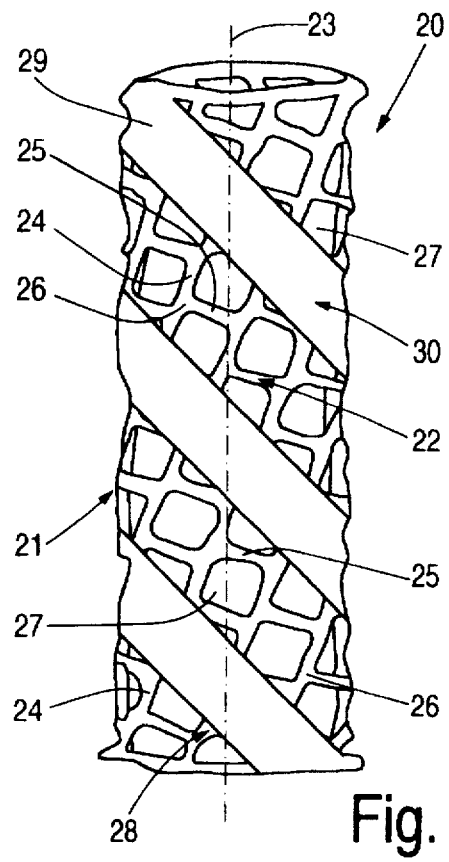
FIG. 1 shows a side view of a packing element according to a first exemplary embodiment of the invention.

FIG. 1 shows a packing element 20 with a tube-shaped base member 21. The base member 21 has a net-like structured outer surface 22. This net-like structured outer surface 22 is formed by ribs 24, 25 which extend spirally in the direction of the longitudinal center axis 23 of the base member 21. The ribs 24, 25 extend perpendicularly relative to one another, the ribs 25 being designed such that they do not extend continuously but are connected to one another offset of one another in the region of junctions 26. The ribs 24, on the other hand, are designed so as to extend continuously. The ribs 24, 25 embrace the openings 27. The ribs 24, 25 define the surface of the outer surface 22 and, consequently, the specific growing surface for the biomass. To increase the specific growing surface, a surface-increasing element 28 is arranged on the outer surface 22 of the base member 21. The element 28 is designed as a strip which is spirally rolled around the outer surface 22 of the base member 21. The strip 29 partly covers the outer surface 22 of the base member 21. Twenty to 80%, preferably 50% of the outer surface 22 of the base member 21 is covered by the strip 29.

The base member 21 of the packing element 20 is made of plastic and is produced by extrusion. The strip 29 is also made of plastic and can also be produced by extrusion. The packing element 20 and the strip 29 can be formed from the same plastic. The plastic is highly resistant to at least high, preferably low temperatures. For this purpose, polyolefines, as for example high-pressure-process polyethylene, low-pressure polyethylene, polypropylene or polyvinylidene fluoride can be used. The strips 2, as well as the base members 21, can either be made of the same or of different plastics.

The strips 29 are formed from a thin plastic foil. The thickness of the strip-shaped foil is approximately 10 to 300 μm, preferably 200 μm. The breadth of the strip-shaped foil, and thus of the strip 29, is 10 to 50 mm, preferably 30 mm.

The strips 29 are formed from a foil with a smooth surface. Furthermore, the strips 29 are at least fluid impermeable, preferably gas impermeable, because of the use of a special foil.

Immediately after the extrusion of the base members 21, the strip 29 is applied, preferably wound round the still heated base member 21 from the outside. As a consequence of the high temperature of the base member 21, the base member 21 and the strip 29 are inseparably attached to one another. The joining of the strip 29 with the base member 21 is direct and durable. Due to the formation of the strip 29 from a thin foil, a low residual energy in the base member 21, which is still heated from the extrusion, is sufficient to create a durable, non-releasable join between the base member 21 and the strip 29. As a result, the strip 29 is fused to the ribs 24, 25 of the net-like structured outer surface 22 of the base member 21, at least in the region of the intersecting points 29 of the strip 29 with the ribs 24, 25, so that, after the cooling of the base member 21 and the strip 29, both are directly attached to one another by welding or sealing.

As a modification of this production process, it is equally conceivable to join the still hot or heated strip 29 to a cooled or still warm or heated base member 21.

Figure 2:
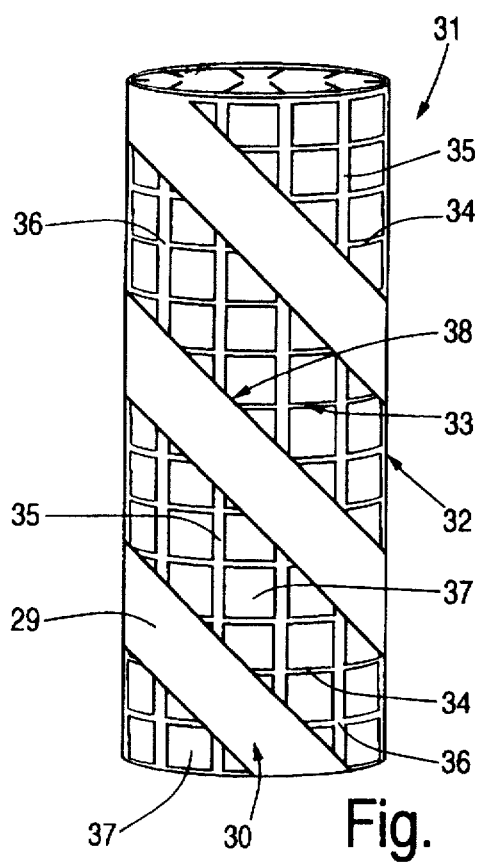
FIG. 2 shows a packing element according to a second exemplary embodiment of the invention, in a representation analogous to FIG. 1.

A packing element 31, according to a second exemplary embodiment of the invention is shown in FIG. 2. The packing element is also comprised of a base member 32 with a net-like structured outer surface 33. The outer surface 33 is formed by intersecting transverse ribs 34 and longitudinal ribs 35. Longitudinal ribs 35 and transverse ribs 34 extend continuously and intersect in the junctions 36. Transverse ribs 34 and longitudinal ribs 35 embrace openings 37. Transverse ribs 34 and longitudinal ribs 35 form the surface of the outer surface 33 and thus the specific growing surface for the biofilm. To increase the specific growing surface, a surface-increasing element 38 is assigned to the outer surface 33 of the base member 32. Analogously to the element 28 of the exemplary embodiment of FIG. 1, the element 38 is made of a strip-shaped foil and is also arranged on the outside of the base member 32. Consequently, the same reference numerals are used for the element 38 according to FIG. 2, as for the element 28 according to FIG. 1. The element 38 covers the openings 37 and the transverse ribs 34 and longitudinal ribs 35 of the outer surface 33 in the region of the element 38 on the outside of the base member 32.

Figure 3:
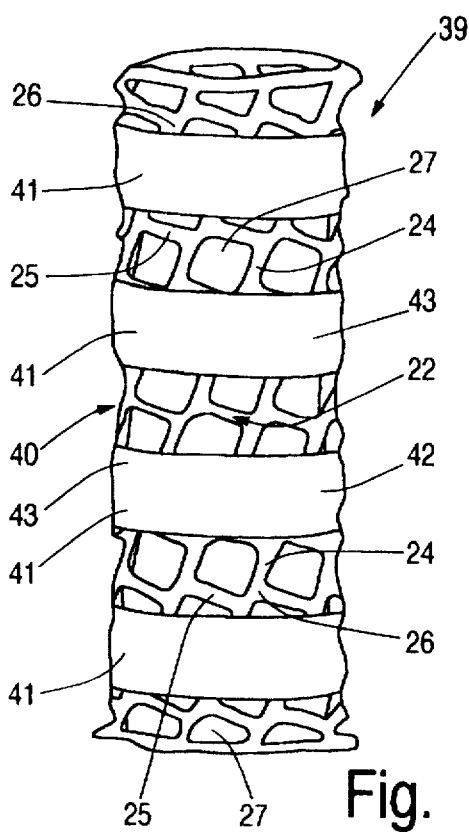
FIG. 3 shows a packing element according to a third exemplary embodiment of the invention, in a representation analogous to FIGS. 1 and 2.

According to a further exemplary embodiment of the invention, a packing element 39 is comprised of a base member 40 and a plurality, specifically four, surface-increasing elements 41 (FIG. 3). The base member 40 of the packing element 39 is designed analogously to the base member 21 of the packing element 20 according to FIG. 1. Consequently, the same reference numerals are used for the base member 40 and the base member 21 according to FIG. 1. To increase the specific growing surface for the biofilm, the four surface-increasing elements 41 are arranged on the outer surface 22 of the base member 40. The elements 41 are designed as strips 42 and wound round the outer surface of the base member 40 in the form of closed rings 43. The strips 42 or the rings 43 are arranged at a distance from one another and, therefore, only partly cover the outer surface 22 of the base member 40, specifically approximately 50% thereof. The surface of the strips 42 or of the rings 43 is smooth. The base member 40 and the strips 42 consist of extruded plastic. The packing element 39 is produced in the same manner as the packing elements 30 and 31. The strips 42 have the same design as the strips 29, and are thus also made of a thin, smooth plastic foil, which is directly and inseparably attached to the base member 40.

Figure 4:
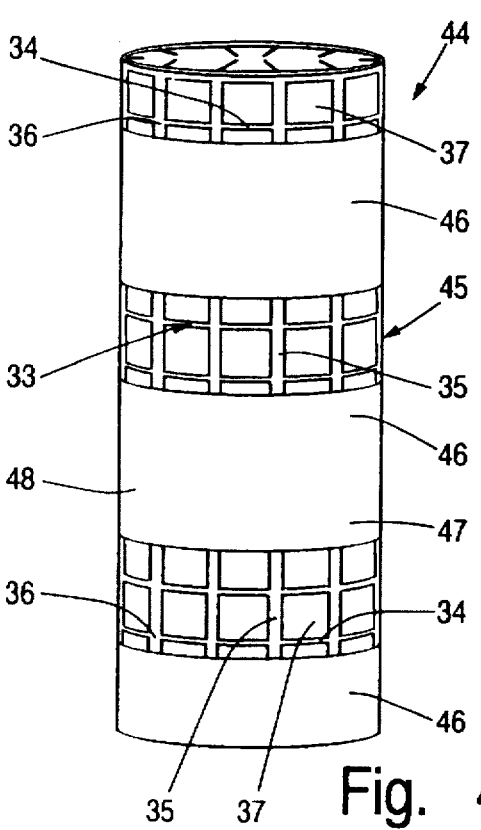
FIG. 4 shows a packing element according to a further exemplary embodiment of the invention, in a representation analogous to FIGS. 1 to 3.

FIG. 4 shows a packing element 44, which is comprised of a base member 45 and three surface-increasing elements 46. The base member 45 is structured analogously to the base member 32 according to FIG. 2. Consequently, the same reference numerals are used for the base member 45 and the base member 32 according to FIG. 2. The surface-increasing elements 46 are again formed from strips 47 made of plastic film, and are arranged on the outer surface 33 of the base member 45 in the form of closed rings 48, in particular directly and inseparably attached to the outside of the outer surface 33. The surface of the strips 47 is smooth and impermeable. Furthermore, the strips are arranged at a distance from one another. Consequently, the strips 47 only partly cover the outer surface 33 of the base member 45. It is, however, also conceivable that the strips 47 cover 100% of the outer surface 45, i.e. the complete outer surface 45.

Figure 5:
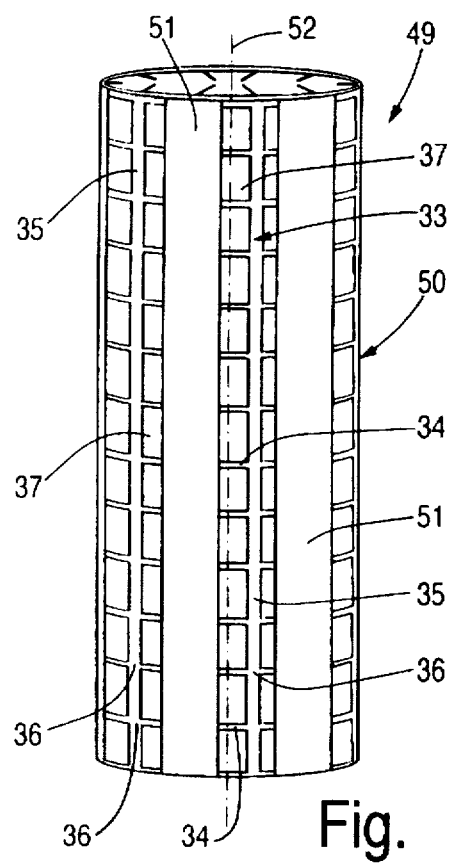
FIG. 5 shows a packing element according to a further exemplary embodiment of the invention, in a representation analogous to FIGS. 1 to 4.

FIG. 5 shows a packing element 49 with a base member 50 and a plurality of surface-increasing elements 51. The base member 50 is designed analogously to the base member 32 according to FIG. 2. Therefore, the same reference numerals are used for the base member 50 and the base member 32 according to FIG. 2. The strip-shaped elements 51 are arranged on the outer surface 33 of the base member 50 in such a manner that they extend in the direction of the longitudinal center axis 52 of base member 50. The surface of the elements 50, which are formed from strip-shaped plastic foil, is smooth an impermeable. Furthermore, the elements 51 are arranged at a distance from one another.

Figure 6:
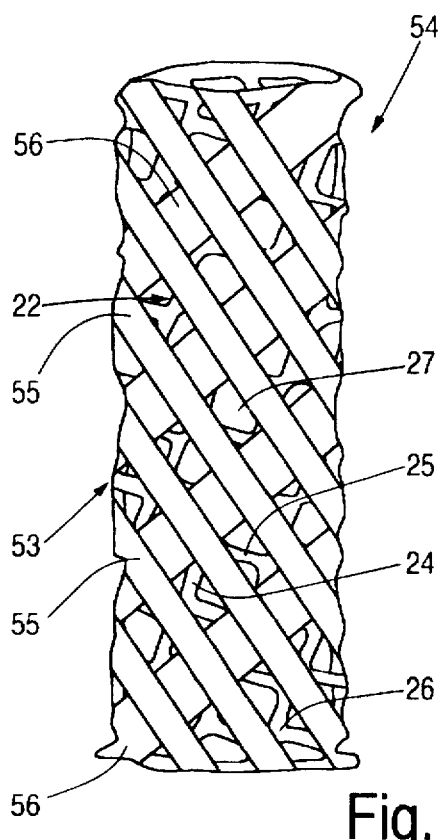
FIG. 6 shows a packing element according to a further exemplary embodiment of the invention, in a representation analogous to FIGS. 1 to 5.

According to a further exemplary embodiment of the invention (FIG. 6), a plurality of surface-increasing elements 55, 56 are arranged on a base member 53 of a packing element 54. The base member 53 is designed analogously to the base member 21 according to FIG. 1. Consequently, the same reference numerals are used. The elements 55, 56 are arranged in spirals on the outer surface 22 of the base member 53, and fixedly attached thereto. The elements 55 are wound round the outer surface 22 in the opposite direction of the elements 56. The elements 55, 56 thus form a net-like structure. It emerges from FIG. 6 that the elements 55 have a smaller breadth than the elements 56. The surfaces of the elements 55, 56, which are formed from strips of a thin plastic foil, are smooth and impermeable.

Figure 7:
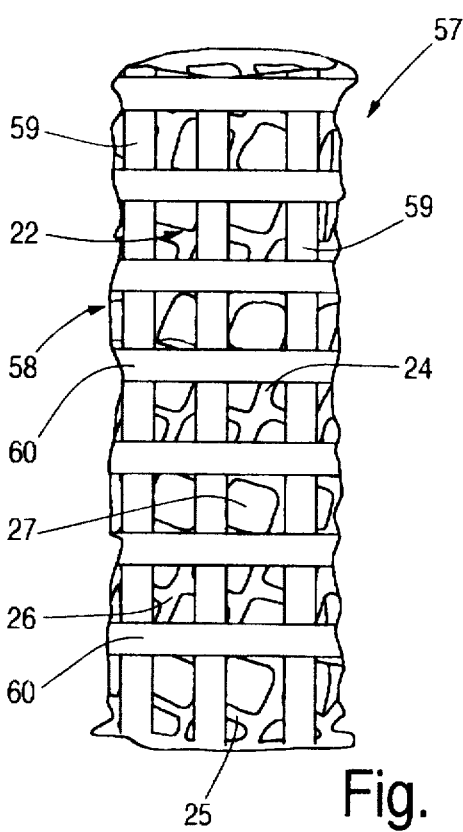
FIG. 7 shows a packing element according to a further exemplary embodiment of the invention, in a representation analogous to FIGS. 1 to 6.

FIG. 7 shows a packing element 57 with a tube-shaped base member 58. The base member 58 is designed analogously to the base member 21 according to FIG. 1. Therefore, the same reference numerals are used. A plurality of surface-increasing elements 59, 60 are arranged on the outer surface 22 of the base member 58. The strip-shaped elements 59, 60 extend perpendicularly to one another and form a net-like structure. The surface-increasing elements 59, 60 are arranged on the outer surface 22 in such a manner that the elements 59 extend in the direction of a longitudinal center axis 61 of the base member 58, whereas the elements 60 are wound round the outer surface 22 in a ring-shaped manner. The surfaces of the elements 59, 60, which are made of strips of plastic foil, are smooth and impermeable.

Figure 8:
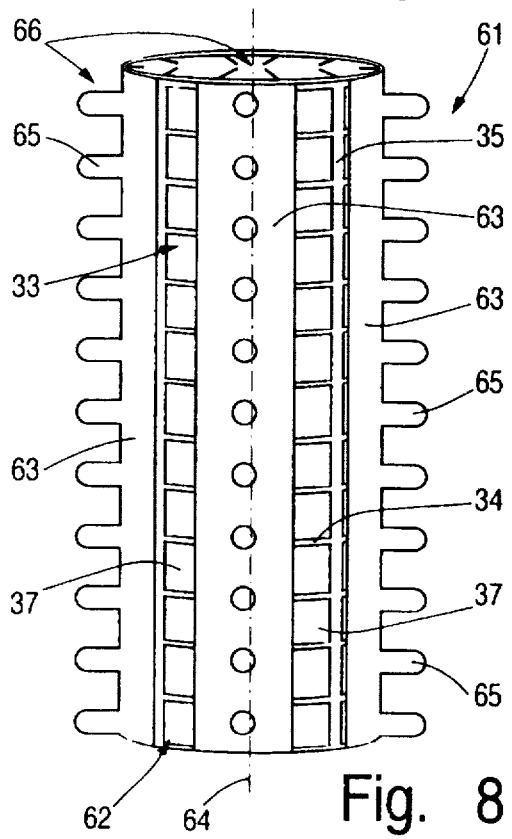
FIG. 8 shows a packing element according to a further exemplary embodiment of the invention, in a representation analogous to FIGS. 1 to 7.

A further exemplary embodiment of a packing element 61 according to the invention is shown in FIG. 8. The packing element 61 is also comprised of a base member 62 and surface-increasing elements 63. The base member 62 is designed analogously to the base member 32 according to FIG. 2. Consequently, the same reference numerals are used. The surface-increasing, strip-shaped elements 63 are arranged on the outer surface 33 of the base member 62 in such a manner that the elements 63 extend in the direction of a longitudinal center axis 64 of the base member 62. The surface of the strip-shaped surface-increasing elements 63 is not smooth but structured. For this purpose, the surface of the elements 63 is provided with distance members 65. The distance members 65 project perpendicularly from the surface of the elements 63. Furthermore, the distance members 65 of an element 63 form rows 66. The distance members 65 of a row 66 are disposed at equal distances from one another. Base member 62, elements 63, and distance members 65 are made of extrudable plastic.

In addition to the exemplary embodiments shown in FIGS. 1 to 8, any combination of base members with and without distance members is conceivable. The elements with or without distance pieces may have simple or multiple spiral windings, simple or multiple crosswindings, and may form structures extending in the longitudinal direction and transversely to the longitudinal direction. Moreover, 100% of the outer surfaces of the base members may be covered by the surface-increasing elements. It is also conceivable that the base members have a polygonal cross-section.

Figure 11:
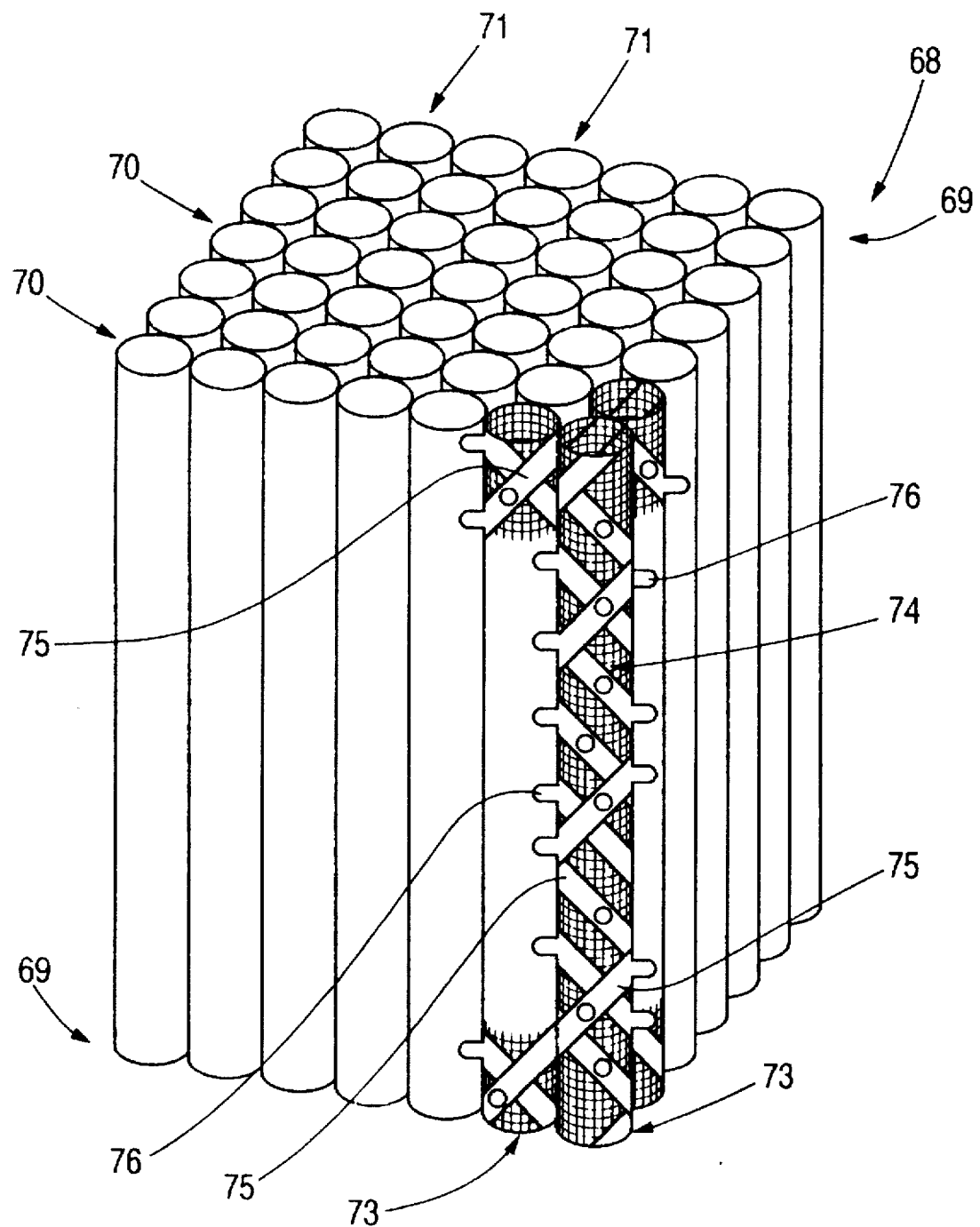
FIG. 11 shows a further exemplary embodiment of a block of packing material in a representation analogous to FIGS. 9 and 10.

FIGS. 9 to 11 show blocks of packing elements 66, 67 and 68 for e.g. submersed packed beds.

The block of packing elements 66 according to FIG. 9 comprises a multitude of identical packing elements 20 according to FIG. 1. For forming the block of packing elements 66, the packing elements 20 according to FIG. 1 are welded together, preferably at their end faces 69, by means of pressure welding. The plastic-foil strips 29 of adjacent packing elements 20 are not connected to one another, but merely adjoin one another. Preferably, adjacent packing elements 20 are provided with a differently, especially oppositely directed winding of the strips 29. As a result, the strips 29 of adjacent packing elements adjoin one another only in certain regions, specifically at the junctions of the strips 29 of two different adjacent packing elements 20. The packing elements 20 are arranged in the shape of a matrix 72, thereby forming longitudinal rows 70 and transverse rows 72.

According to a further exemplary embodiment of the invention, the block of packing elements 67 is comprised of a multitude of packing elements 49 according to FIG. 5 which are welded together (FIG. 10). The packing elements 49 are also arranged in the shape of a matrix, thereby forming longitudinal rows 70 and transverse rows 72.

FIG. 11 shows a further embodiment of a block of packing elements 68. The block of packing elements 68 is comprised of a multitude of packing elements 73 welded together and being arranged in longitudinal rows 70 and transverse rows 71. On a outer surface 74 of the packing element 73, a plurality of surface-increasing elements 75 are arranged, specifically in the form of a double crosswinding. The elements 75 are provided with distance pieces 76. As a result, a defined distance between the packing elements 73 of the block of packing elements is always ensured. Sticking together of the outer surfaces 74 of the packing elements 73 which carry the biofilm is thereby avoided.

It is conceivable to produce the packing elements entirely or partly from another material than plastic. The base members, for example could be made from metallic materials and/or the surface-increasing elements from a metal or aluminum foil.

We claim:

1. Packing material comprising at least one tube-shaped base member which has a net structured outer surface on which at least one surface-increasing element is arranged, said at least one surface-increasing element having a strip-shaped design and being water impermeable and being directly connected to the base member.

2. Packing material according to claim 1, for biological waste water treatment.

3. Packing material as claimed in claim 2, wherein the elements (28, 38, 55, 56, 75) are arranged round the outside of the outer surface (22, 33, 74) in spirals.

4. Packing material as claimed in claim 2, wherein the elements (51, 59, 63) are arranged on the outer surface (22, 33) such that they extend in the direction of a longitudinal center axis (52, 66) of the base member (50, 58, 62).

5. Packing material as claimed in claim 2, wherein the elements (41, 46, 60) are arranged round the outer surface (22, 33) in a ring-shaped manner.

6. Packing material as claimed in claim 2, wherein the elements (55, 56, 75) are arranged in spirals on the outer surface (22, 33, 74) in opposing directions, such that the elements (55, 56, 75) intersect and form a net-shaped structure.

7. Packing material as claimed in claim 2, wherein the elements (28, 38, 41, 46, 51, 55, 56, 59, 60, 63, 75) are directly attached to the base member (21, 32, 40, 45, 50, 53, 58, 62).

8. Packing material as claimed in claim 7, wherein the elements (28, 38, 41, 46, 51, 55, 56, 59, 60, 63, 75) are inseparably attached to the base member (21, 32, 40, 45, 50, 53, 58, 62).

9. Packing material as claimed in claim 2, wherein the elements (28, 38, 41, 46, 51, 55, 56, 59, 60, 63, 75) are arranged on the outer surface (22, 33, 74) in such a manner that the outer surface is partially covered.

10. Packing material as claimed in claim 9, wherein 20% to 80% of the outer surface (22, 33, 74) is covered.

11. Packing material as claimed in claim 1, wherein the surface of the elements (28, 38, 41, 46, 51, 55, 56, 59, 60) is configured to be smooth.

12. Packing material as claimed in claim 2, wherein a surface (30) of at least some elements (63, 75) is provided with projections.

13. Packing material as claimed in claim 2, wherein the elements (28, 38, 41, 46, 51, 55, 56, 59, 60, 63, 75) are formed from a strip.

14. Packing material as claimed in claim 9, wherein about 50% of the outer surface is covered.

* * * * *